United States Patent
Xu et al.

(10) Patent No.: US 8,615,614 B2
(45) Date of Patent: Dec. 24, 2013

(54) MESSAGE PASSING USING DIRECT MEMORY ACCESS UNIT IN A DATA PROCESSING SYSTEM

(75) Inventors: Kun Xu, Austin, TX (US); Tommi M. Jokinen, Austin, TX (US); David B. Kramer, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 201 days.

(21) Appl. No.: 13/307,271

(22) Filed: Nov. 30, 2011

(65) Prior Publication Data

US 2013/0138841 A1    May 30, 2013

(51) Int. Cl.
  *G06F 13/28* (2006.01)
  *G06F 12/00* (2006.01)
(52) U.S. Cl.
  USPC ............................................. 710/26; 711/117
(58) Field of Classification Search
  None
  See application file for complete search history.

(56) References Cited

U.S. PATENT DOCUMENTS

| | | | |
|---|---|---|---|
| 6,665,759 B2 | 12/2003 | Dawkins et al. | |
| 6,973,510 B2 | 12/2005 | Arndt et al. | |
| 7,130,982 B2 | 10/2006 | Boutcher et al. | |
| 7,249,208 B2 | 7/2007 | Aslot et al. | |
| 7,523,229 B2 | 4/2009 | Hatakeyama | |
| 2005/0080869 A1 | 4/2005 | Bender et al. | |
| 2007/0067435 A1* | 3/2007 | Landis et al. | 709/224 |
| 2008/0114937 A1* | 5/2008 | Reid et al. | 711/117 |
| 2008/0147822 A1 | 6/2008 | Benhase et al. | |
| 2008/0178201 A1* | 7/2008 | Billau et al. | 719/324 |
| 2009/0125604 A1 | 5/2009 | Chang et al. | |

* cited by examiner

*Primary Examiner* — Hyun Nam
(74) *Attorney, Agent, or Firm* — Mary Jo Bertani; Joanna G. Chiu

(57) ABSTRACT

A method includes generating, by a first software process of the data processing system, a source partition descriptor for a DMA job which requires access to a first partition of a memory which is assigned to a second software process of the data processing system and not assigned to the first software process. The source partition descriptor comprises a partition identifier which identifies the first partition of the memory. The DMA unit receives the source partition descriptor and generates a destination partition descriptor for the DMA job. Generating the destination partition descriptor includes translating, by the DMA unit, the partition identifier to a buffer pool identifier which identifies a physical address within the first partition of the memory which is assigned to the second software process; and storing, by the DMA unit, the buffer pool identifier in the destination partition descriptor.

19 Claims, 3 Drawing Sheets

MESSAGE PASSING USING DIRECT MEMORY ACCESS UNIT IN A DATA PROCESSING SYSTEM

BACKGROUND

1. Field

This disclosure relates generally to data processing systems, and more specifically, to message passing using a direct memory access unit within a data processing system.

2. Related Art

Conventional direct memory access (DMA) operations move information from one location to another, typically independent of a processing unit. In today's multi-core and even single core multi-operating system devices, there is a desire to have partitioning amongst the independent active execution entities. Partitioning memory isolates the entities such that they cannot advertently or inadvertently corrupt or pollute each other, just as though they used separate discrete devices. In a partitioned system, there is still a need to send messages to other partitions but retain buffer isolation on the other partitions due to the partition protection.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
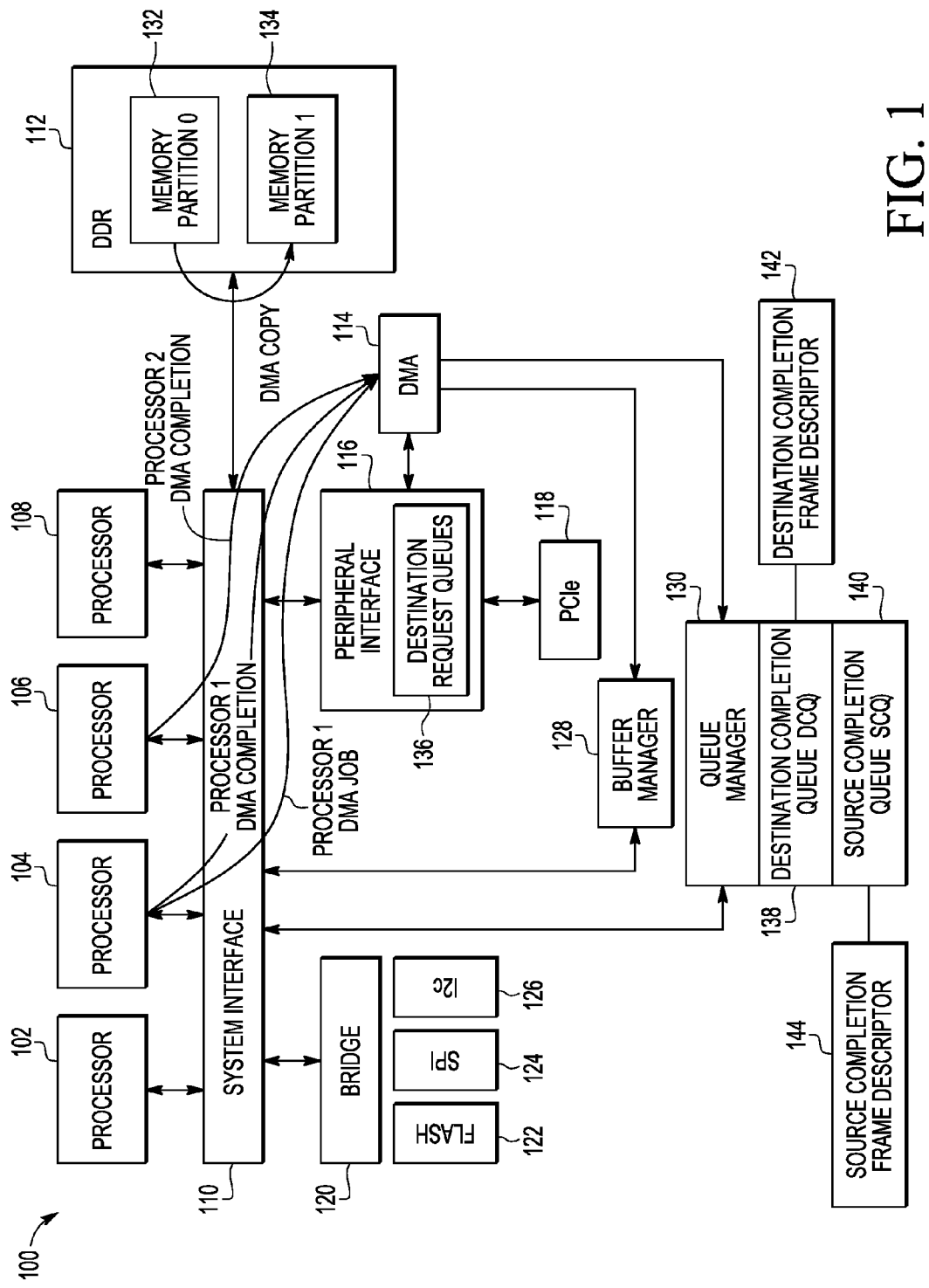
FIG. 1 illustrates, in block diagram form, a data processing system having a direct memory access (DMA) unit in accordance with one embodiment of the present invention.

A direct memory access (DMA) unit is capable of using hardware to accelerate messages between memory partitions with a DMA operation. A DMA unit is configured to prepare data buffers in the other partitions, write the message to the acquired buffer space and enqueue destination completion information when the job is done. DMA virtual jobs are prepared and enqueued by a process using one partition to send messages to one or more partitions used by other respective one or more other processes. A compound frame table points to a source descriptor, destination descriptor (or scatter/gather frame table pointing to a list of destination descriptors in case of multicast), and an address pointer to source message data. Destination descriptors include a virtual data partition identifier (VBPID) that can be translated to another partition identifier through a pre-configured mapping table. A buffer pool identifier (BPID) indicates the partition where corresponding destination buffers can be acquired. The DMA has another pre-configured VBPID to logical I/O device number (LIODN) mapping table. The DMA gains a destination LIODN through the mapping table based on the BPID from the destination descriptor. Using the destination LIODN, the DMA can gain access to memory space in the destination partition. With the acquired destination data buffer and mapped LIODN, the DMA can move the source message data into the destination partition memory space. When a data buffer is not big enough to contain the entire message, the DMA can automatically build a scatter/gather table in the destination space to break the message into smaller segments. Depending on the setting of a completion status enqueue required indicator, when the DMA completes moving message data to the destination partition(s), the DMA can enqueue the original frame descriptor address and control word and updated completion status to a source completion queue to inform the process that created the DMA job that the DMA job has also completed. The DMA can also enqueue a destination frame descriptor into a destination completion queue.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

FIG. 1 illustrates a data processing system 100 in accordance with one embodiment. System 100 includes one or more processors 102-108, system interface 110, memory unit 112, direct memory access (DMA) unit 114, peripheral interface 116, peripheral component interface express (PCIe) system 118, bridge 120, flash memory 122, serial peripheral interconnect (SPI) 124, inter-integrated circuit (I2C) interface 126, buffer manager 128, queue manager 130, first memory partition 132 and second memory partition 134 in memory unit 112, destination request queues 136 in peripheral interface 116, and destination completion queue 138 and source completion queue 140 in queue manager 130. Destination completion queue 138 stores one or more destination completion frame descriptors 142 and source completion queue 140 stores one or more source completion frame descriptors 144.

Processors 102-108 can each execute one or more processes to perform various functions. System 100 may be implemented as a system-on-chip (SOC) or as an embedded processing system or the like. System 100 may be configured according to many different types of processing applications. Any number of processors may be present within system 100. The processes may be executing on a single processor 102-108, or distributed among two or more processors 102-108.

System interface 110 may be configured according to any type of bus structure, switch structure, switch fabric, network structure, etc., for enabling communication between processors 102-108, memory unit 112, peripheral interface 116, and bridge 120.

DMA unit 114 can include one or more DMA engines (not shown). In one embodiment, each DMA engine is capable of handling one DMA job or transaction at a time. Each DMA job performs a data transfer from one source (i.e. source device) to one or more destinations (i.e. target devices). Any read or write requests directed to devices coupled to system interface 110 (such as processors 102-108, memory unit 112, and flash memory 122, for example) are provided to destination request queues 136. As the requests from this queue are processed (i.e. consumed) by the appropriate target devices coupled to system interface 110, DMA unit 114 is able to provide more requests to destination requests queue 136.

Peripheral interface 116 can communicate with DMA unit 114, peripheral component interconnect express (PCIe) system 118, and any number of other suitable peripheral devices. Peripheral interface 116 enables communication between peripheral devices, such as PCI express 118, DMA unit 114, and other suitable peripherals and also enables communication between the peripheral devices and to other portions of system 100 by way of system interface 110. Also, DMA unit 114 may direct data transfers between peripherals by way of peripheral interface 116 and between peripherals and devices coupled to system interface 100 by way of peripheral interface 116 and system interface 110. The illustrated peripheral devices are exemplary only and it is understood that other types of peripherals and I/O devices may be present within system 100.

Peripheral interface 116 includes switch circuitry and a plurality of request queues. Each device coupled to peripheral interface 116 within system 100 has a corresponding request queue, such as, for example, a system destination request queue 136 coupled to switch circuitry and provides read and write requests directed to a device coupled to system interface 110 to system interface 110. That is, system destination request queue 136 stores the read and write requests which may be received from any of the devices coupled to peripheral interface 116 and are waiting to be processed by one of the devices coupled to system interface 110 (such as, for example, processors 102-108 and memory unit 112). Similarly, other destination requests queues would be present for any other peripherals coupled to peripheral interface 116, each queue storing read and write requests directed to the corresponding peripheral. Peripheral interface 116 can include switch circuitry (not shown) that routes the read and write requests from the originating device to the appropriate destination queue based on the target of the read or write request. The destination queues may be provided within peripheral interface 116, however, in alternate embodiments, each of the destination queues can be located within each corresponding peripheral or elsewhere within system 100.

Any suitable type of device such as FLASH memory 122, serial peripheral interconnect (SPI) 124, inter-integrated circuit (I2C) interface 126 may be coupled to system 100 through bridge 120.

Memory unit 112 can be configured in any suitable manner and implemented using any type of memory devices, such as random access memory (RAM) devices or the like. In one embodiment, memory unit 112 includes double data rate synchronous dynamic RAM (DDR SDRAM or DDR1, SDRAM, DDR2 SDRAM, DDR3, DDR4 etc.) devices and the like, although alternative types of memory devices may be used, such as single data rate (SDR) SDRAM devices.

In operation, memory unit 112 and other devices of system 100 (such as PCI Express 118, and other peripherals) are memory mapped devices which are accessed or addressed according to a memory map. Each memory map is an area of one or more addressable memory locations for reading from or writing to the memory mapped devices as understood by those skilled in the art. DMA unit 114 may be used to transfer data between devices of system 100. For example, DMA unit 114 may direct the transfer of data between two or more devices coupled to peripheral interface 116. In this example, data is transferred by way of peripheral interface 116 between peripheral devices. DMA unit 114 may also direct the transfer of data between one or more devices coupled to peripheral interface 116 and one or more devices coupled to system interface 106.

Memory unit 112 may be divided into two or more partitions 132, 134. Each partition 132, 134 is typically allocated to a particular process, with partitions 132, 134 being protected by security features in DMA unit 114 that prevent processes from accessing partitions allocated to other processes. Yet, there may be times when a process needs to share data with the one or more other processes. In such cases, DMA unit 114 can be used as a trusted host to access partitions allocated to other processes on behalf of a requesting process. The requesting process can then pass messages to one or more of the other processes by writing data to the respective processes' memory partitions via the DMA unit 114. Peripheral interface 116 can include destination request queues 136 that store requests from one process to access partition(s) allocated to one or more other processes. The requesting process does not have direct access to the memory partitions allocated to the other processes, and thus security of the memory partitions is maintained.

Buffer manager 128 is coupled between system interface 110 and DMA unit 114. The buffer manager 128 acts as a central resource in the system 100 for managing pools of data storage buffers and the acquisition and release of these buffers on behalf of multiple processor cores, network interfaces and hardware accelerators in a multi-core system-on-chip. The buffer manager 128 provides a direct-connect interface to the DMA 114 for acquisition and release of buffers associated with a Buffer Pool Identifier (BPID) provided in data structures such as 202, 220 and 326. Buffer pools are used for both payload data and building scatter/gather tables 132, 134.

Queue manager 130 is coupled between system interface 110 and DMA unit 114 and can include destination completion queue 138 and source completion queue 140. The queue manager 130 acts as a central resource in the multi-core system 100, managing the queueing of data between multiple processor cores, network interfaces, and hardware accelerators in a multicore system-on-chip. The DMA unit 114 dequeues the source frame descriptor 202 from queue manager 130. The source frame descriptor 202 includes information about the source and one or more destinations involved in the data transfer. Upon completion the source frame descriptor 202 may be enqueued to queue manager 130 for the given source completion frame. Upon completion the destination frame descriptor 220 may be enqueued to queue manager 130 for the given destination completion frame queue 210, 212.

Figure 2:
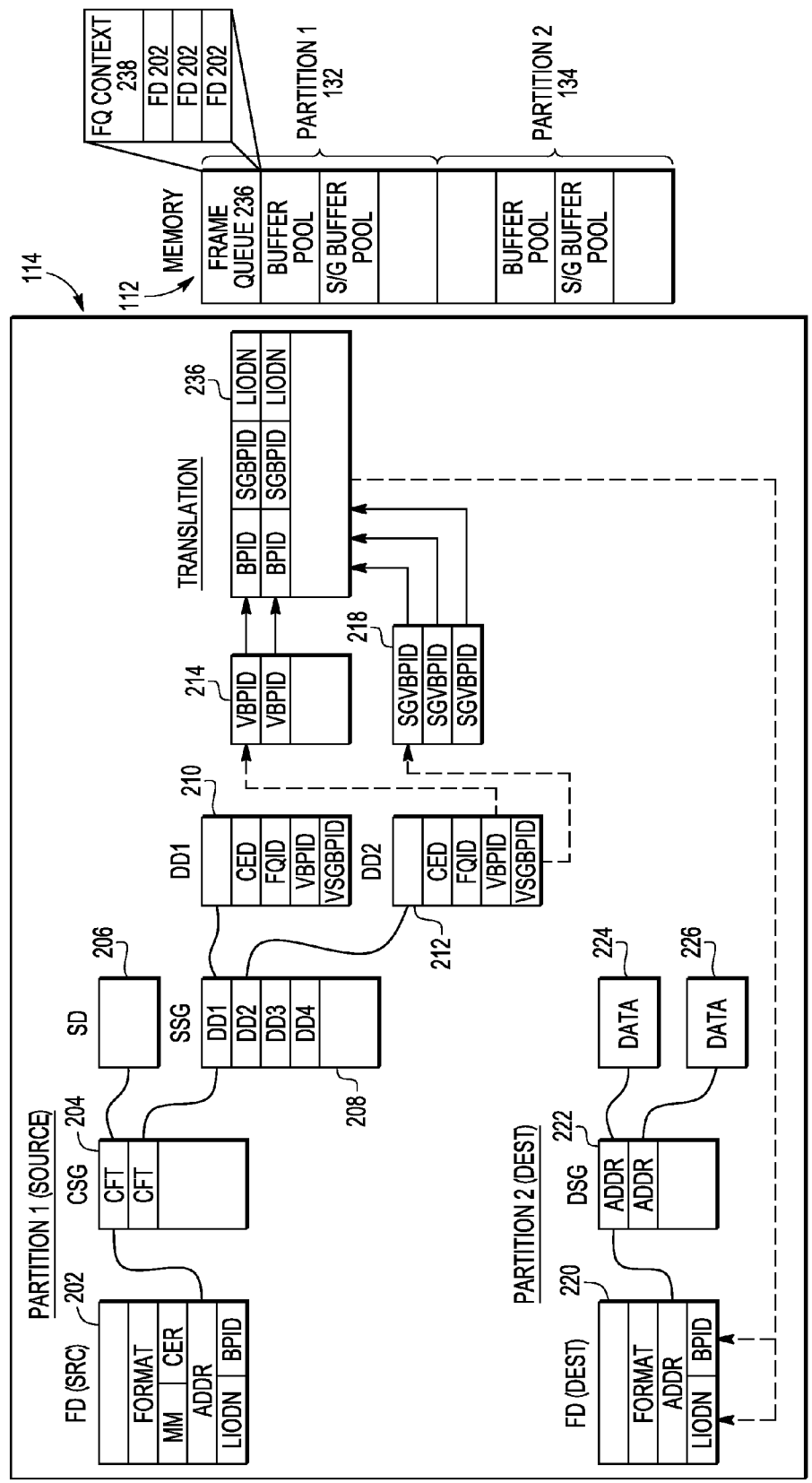
FIG. 2 illustrates, in block diagram form, the DMA unit of FIG. 1 and the memory unit of FIG. 1, in accordance with one embodiment of the present invention.

FIG. 2 illustrates the configuration and flow of various source and destination data structures in DMA unit 114 and memory unit 112 of FIG. 1, in accordance with one embodiment of the present invention. The data structures used for a source can include source frame descriptor (SFD) 202, compound scatter/gather table 204, source descriptor 206, source scatter gather descriptors 208, destination descriptors 210, 212, virtual memory partition or buffer pool identifiers 214, destination translation table 216, and scatter/gather virtual memory partition or buffer pool identifiers table 218. The data structures used for a destination can include destination frame descriptor (DFD) 220, destination scatter/gather table 222, and data buffers 224, 226.

SFD 202 includes an address field which points to a compound frame table (CFT) 204. SFD 202 also includes a inter-partition messaging mode indicator of whether the current job is to be performed using a memory partition that is allocated to a process that is not the same as the requesting process; a logical I/O device number (LIODN) field that holds a value used for authorization and translation of the requested DMA transaction, and a buffer pool identifier (BPID) field that holds a value for buffer allocation associated with the compound frame table (CFT) or compound scatter/gather table (CSGT) pointed to by the FD. SFD 202 may also include other fields of information as needed for defining the DMA job or operation.

CSG table 204 can include two compound frame tables (CFT). Each CFT can include a source descriptor (SD) 206 and one or more destination descriptors (DD1 . . . DDN) that are compiled in source scatter/gather (SSG) table 208. SSG table 208 can therefore include any integer number N of destination descriptors 210, 212 which may support a multicast DMA job to up to N destinations. The source descriptor 206 can include a length which indicates the total length of the source data to be transferred. The source descriptor 206 may also include other fields of information as needed for defining the source.

Each destination descriptor 210, 212 can include a completion enqueue disable (CED) indicator that indicates whether to enqueue to inform the destination when a message has finished being transferred to a memory partition being used by a process at the corresponding destination. The CED indicator can be set based on a completion status enqueue required indicator is set in the frame descriptor. Note that in some implementations, MM (inter-partition message mode) is set, otherwise DD stores real BPID and SGBPID since source and destination belongs to the same partition. The destination descriptor 210, 212 can further include a VBPID, SGVBPID and a frame queue identifier (FQID). The SGVB-PID can specify a virtual scatter/gather BPID (SGBPID) that is used by the DMA unit 114 to check out a buffer holding scatter/gather table when a buffer acquire required (BAR) indicator is set in the destination descriptor 210, 212. The VBPID can specify a virtual data partition identifier (BPID) that is used by the DMA unit 114 to check out a buffer holding data when the BAR indicator is set in the destination descriptor 210, 212. The VBPIDs and SGVBPIDs are extracted and stored in VBPID table 214. The FQID can be used to enqueue completion status when a completion enqueue required indicator (CER) is set in FD 202 and CED is cleared in destination descriptor 210, 212. The destination descriptor 210, 212 may also include other fields of information as needed for defining the destination.

Destination translation table 216 can be used to store BPIDs, SGBPIDs, and LIODNs as translated from the VBPIDs in table 214 and SGVBPID in table 218.

Memory unit 112 is also shown in FIG. 2 including partitions 132, 134 with frame queue 236, one or more buffer pools, and/or scatter/gather buffer pools. The BPIDs and SGBPIDs in table 218 point to respective buffer pools in memory partitions 132, 134 and are not visible to or accessible by the requesting process that initiated the DMA job, or other processes that are running outside of DMA unit 114. Frame queue 236 can include a frame queue (FQ) context 238 and one or more frame descriptors 202. The frame descriptors 202 include information that describes a corresponding DMA job. The FQ context 238 includes an identifier for a corresponding source completion queue 140 (FIG. 1).

With regard to the data structures used in memory partition 134 for a destination, destination frame descriptor (DFD) 220 can be populated with information from translation table 216 and include a format indicator to indicate whether the DMA job involves a compound frame, an address that points to the location(s) for the destination data; the LIODN that specifies a logical I/O device number used for authorization and translation of a transaction (DMA job), and the BPID that specifies the buffer pool (i.e., the data partition where the message data is stored). Destination scatter/gather (DSG) table 222 includes one or more addresses from the frame descriptor 220 that point to the location of the data in data buffers 224, 226.

Thus, in some embodiments, the source partition descriptor can include source frame descriptor 202, source DMA descriptor 206, and destination DMA descriptor 210. The destination partition descriptor can include destination frame descriptor 220.

Figure 3:
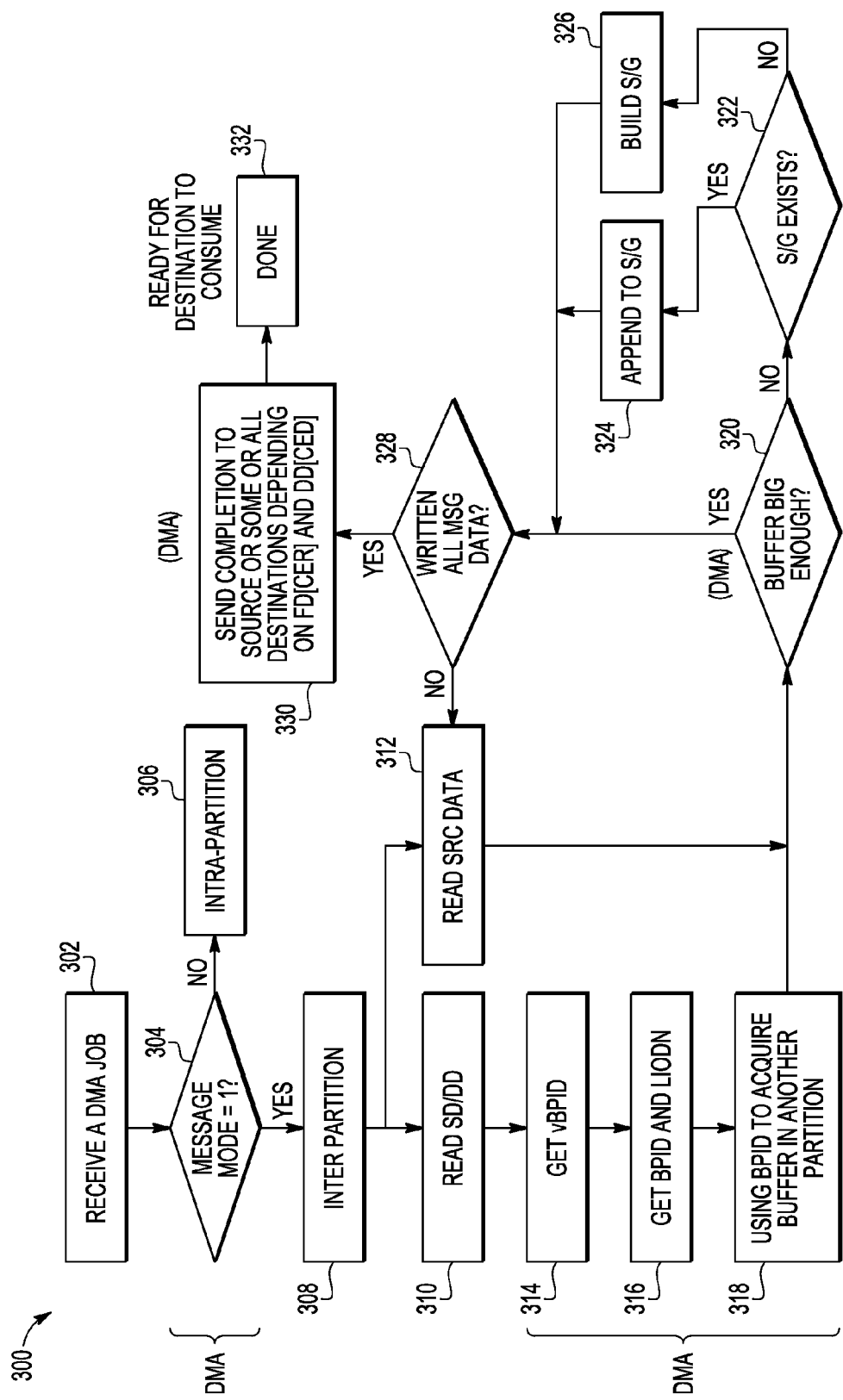
FIG. 3 illustrates, in flow diagram form, operation of the DMA unit of FIG. 1, in accordance with one embodiment of the present invention.

FIG. 3 illustrates, in flow diagram form, a method 300 of operation of data processing system 100 (FIG. 1) for passing messages between memory partitions allocated to different processes, in accordance with one embodiment of the present invention. In step 302, the DMA unit receives a DMA job from destination request queues 136 (FIG. 1). The DMA job is specified with a frame descriptor (FD) 202 (FIG. 2). The DMA unit extracts attributes from the frame descriptor (FD) for the current job.

Flow proceeds to block 304 in which the DMA engine performing the DMA job determines whether a message mode indicator in the frame descriptor is set to indicate that inter-partition messaging is enabled. If inter-partition messaging is not enabled, flow proceeds t block 306 to process the request using the partition in the memory unit 112 (FIG. 1) allocated to the requesting process. If inter-partition messaging is enabled, flow proceeds to block 308 to process the request using a partition in the memory unit allocated to another process by proceeding to blocks 310 and 312. Block 310 can include reading the source descriptor(s) and destination descriptor(s) pointed to by the CFT/CSGT. Block 312 can include reading the source data. Blocks 312 and 310 can be performed simultaneously, or interleaved, depending on the resources available in system 100.

Once the source descriptor(s) and destination descriptor(s) are read in block 310, flow proceeds to block 314 in which the DMA unit acquires a virtual buffer pool identifier (VBPID) or virtual scatter/gather buffer pool identifiers (VSGBPID) from the destination descriptor(s) for the job. Block 316 includes translating the VBPID/VSGBPID to actual buffer pool identifier(s) (BPID) using a translation map in the DMA unit. The translation map can be generated and accessed/modified by a hypervisor in the DMA unit at initialization or other suitable time and typically cannot be accessed or modified by processes running outside of the DMA unit.

Flow then transfers to block 318 in which the BPID is used to acquire a buffer in another partition. Flow then transfers to block 320, which can include determining the buffer acquired in block 318 is large enough to hold all of the data to be transferred for the DMA job. If the buffer is not large enough, flow transfers to block 322 to determine whether the scatter/gather data is already being collected. If the scatter/gather data is already being collected, block 324 appends the data to the existing scatter/gather data. If the scatter/gather data is not already being collected, block 326 starts a new set of scatter/gather data.

Flow then transfers to block 328 to determine whether all data for the message has been written to the buffer. If all data has been written, flow proceeds to block 330 to send completion information to the source or some or all destinations depending on the setting of a completion status enqueue required indicator in the source frame descriptor and a completion enqueue disabled indicator in a destination descriptor before transferring to block 332 to finish and allow the destination to consume the message. Destination completion frame descriptors 142 (FIG. 1) can be used to send completion information to destination completion queue 138, and source completion frame descriptors 144 (FIG. 1) can be used to send completion information to source completion queue 140.

Referring back to block 328, if all the data for the message has not been written to the buffer, flow transfers to block 312 to continue reading the message data.

Referring back to block 320, if the buffer is large enough, flow transfers to block 328 to determine whether all data for the message has been written to the buffer. If all data has been written, flow proceeds to block 330 to send completion information to the source or some or all destinations depending on the setting of a completion status enqueue required indicator in the source frame descriptor and a completion enqueue disabled indicator in a destination descriptor before transferring to block 332 to finish and allow the destination to consume the message. Referring back to block 328, if all the data for the message has not been written to the buffer, flow transfers to block 312 to continue reading the message data.

Table 1 below shows an embodiment of a source frame descriptor 202 that can be used in system 100 of FIG. 1.

TABLE 1

Source Frame Descriptor Format

| Bits | Name | Description |
|---|---|---|
| 0-1 | DBG | Debug bits are mirrored back in the completion FD for system debug purpose. |
| 2-15 | LIODN | Logical I/O device number. Used for authorization and translation of transaction. |
| 16-19 | BPID | Buffer Pool ID. Specifies the buffer pool identifier used for buffer allocation associated with the compound scatter gather table pointed by address. |
| 20-23 | — | Reserved |
| 24-63 | ADDRESS | 40 bit address. |
| 64-66 | FORMAT | Format bits. Example: 001 - compound frame. All other values are reserved or unused. |
| 76-95 | CONG WEIGHT | Used by Queue Manager to perform congestion management and avoidance for this frame. |
| 96-99 | SRTYPE | DMA source read transaction Type. Example: 0100 non-snp read, 0101 snp read, 1XXX enhanced type. |
| 100 | PREF | Read prefetchable bit. Example: 0 - non-prefetchable, 1 - prefetchable. |
| 101 | — | Reserved |
| 102-104 | SQoS | Source transaction QoS. |
| 105 | SSEN | Source stride enable. |
| 106 | BRR | Buffer release required. |
| 107-108 | CER | Completion status enqueue required. Example: 00 - No completion results are enqueued. 01 - completion results are enqueued to inform the source. 10 - completion results are enqueued to FQID specified in DD to inform targets. 11 - both source and targets are informed |
| 109-112 | RTHROT | Read Throttle control. Example: 0 - disabled. >0 - DMA unit stops reading from this source when the number of cycle that takes DMA unit to accumulatively issue 256 byte read from this source is smaller than RTHROT*1000. The DMA unit resumes when the number of cycle elapsed since the first read in this batch reaches RTHROT*1000. |
| 113 | MM | Message mode. Indicates whether data can be transferred across a partition boundary. |
| 114-121 | — | Reserved |
| 122 | RTE | Read transaction error. Including transaction error during descriptor read and data read. |
| 123 | WTE | Write transaction error. Transaction error during data write. |
| 124 | BAE | Buffer acquire error. Buffer acquire request is denied due to depleted buffer resources |
| 125 | SDE | Source Descriptor Error. Including zero length, zero stride size with SSEN == 1, for example. Illegal source transaction priority (3), and illegal SRTYPE. |

TABLE 1-continued

Source Frame Descriptor Format

| Bits | Name | Description |
| --- | --- | --- |
| 126 | DDE | Destination Descriptor Error. Including zero length, Illegal destination transaction priority(3), zero stride size with DSEN == 1, for example. Illegal DWTYPE, and illegal length where Destination length > Source length. Note that Destination length can be smaller to allow different length per destination. |
| 127 | ME | Multiple error. |

Table 2 illustrates an embodiment of a source descriptor 206 that can be used in the DMA unit of FIG. 1.

TABLE 2

Source Frame Descriptor Format

| Bits | Name | Description |
| --- | --- | --- |
| 0-7 | — | Reserved |
| 8-19 | SSS | Source stride size. Number of bytes to transfer before jumping to the next address as specified in the |
| 20-31 | SSD | Source Stride Distance. The source stride distance in bytes from start byte to next start byte. When distance is 0, DMA unit performs source address hold function of I/O device. |
| 32-33 | — | Reserved |
| 34-63 | BCnt | Used to record number of bytes that have been transferred prior to transaction error. Note that this byte count is exact byte count written to current target. |
| 64-87 | — | Reserved |
| 88-127 | Address/BPID | This is to record address of the transaction that has caused transaction error or BPID that has caused buffer acquire error. 0 for normal completion |
| 128-255 | ADD | Alternate Destination Descriptor. Does not exist when FD[ADD] == 0. ADD can be used to save another read. |

Table 3 illustrates an embodiment of a destination DMA descriptor 208 that can be used in the DMA unit of FIG. 1.

TABLE 3

Destination DMA Descriptor Format

| Bits | Name | Description |
| --- | --- | --- |
| 0-3 | DWTYPE | DMA destination transaction type. Example: 0100 non-snapshot (snp) write, 0101 snp write, 1XXX enhanced type |
| 4 | CED | Completion enqueue disabled. Example: 0 - whether to enqueue to inform this target depends on FD[CER], 1 - completion results do not get enqueued to this target regardless of CER |
| 5-6 | — | Reserved |
| 7-9 | DQoS | Destination transaction QoS. |
| 10 | DSEN | Destination Stride enable. |
| 11 | BAR | Buffer acquire required. |
| 12-15 | WTHROT | Write Throttle control. Example: 0 - disabled. >0 - DMA unit stops writing to this target when the number of cycle that takes DMA unit to accumulatively write 256 byte to this target is smaller than WTHROT*1000. The DMA unit resumes when the number of cycle elapsed since the first write in this batch reaches WTHROT*1000. |
| 16-17 | LFLUSH | 00 - last write is non-posted. Example: 01 - last write is non-posted write traced with read. The read is size is same as last write when size <4 B or 4 B otherwise. 10 - reserved 11 - last write is posted. |
| 18-39 | — | Reserved |
| 40-51 | DSS | Destination stride size. Number of bytes to transfer before jumping to the next address. |
| 52-63 | DSD | Destination Stride Distance. The source stride distance in bytes from start byte to next start byte. When distance is 0, the DMA unit performs source address hold function of I/O device. |

TABLE 3-continued

Destination DMA Descriptor Format

| Bits | Name | Description |
|---|---|---|
| 64-81 | — | Reserved |
| 82-87 | SGBPID | Virtual Buffer Pool ID used by DMA unit to check out buffer holding scatter/gather table when DD[BAR] is set. |
| 88-89 | — | Reserved |
| 90-95 | DBPID | Virtual Buffer Pool ID used by DMA unit to check out buffer holding data when DD[BAR] is set. |
| 96-103 | — | Reserved |
| 104-127 | FQID | Frame queue ID used to enqueue completion status when FD[CER] = 0b10. Otherwise reserved. |

Table 4 illustrates an embodiment of a buffer pool identifier address translation register 214, 216 that can be used in the DMA unit of FIG. 1.

TABLE 4

Buffer Pool Identifier Address Translation Register

| Bits | Name | Description |
|---|---|---|
| 0-9 | — | Reserved |
| 10-15 | VBPID | Virtual Buffer Pool ID passed through destination descriptor |
| 16-25 | — | Reserved |
| 26-31 | BPID | Buffer Pool ID |

Table 5 illustrates an embodiment of a buffer pool identifier address translation register 214, 216 that can be used in the DMA unit of FIG. 1.

TABLE 5

Buffer Pool Identifier Address Translation Register

| Bits | Name | Description |
|---|---|---|
| 0-1 | — | Reserved |
| 2-11 | LIODN offset | LIODN offset. When buffer acquire required, DD[BAR] = 1, the buffer pool ID determines the LIODN offset to use for the write data transaction, allowing for copying to a different partition. |
| 12-15 | — | Reserved |
| 16-31 | SIZE | Buffer size<br>Indicates the buffer size for the buffer pool used<br>Example:<br>0x0000 64 Kbytes<br>0x0040 64 bytes<br>0x0041 65 bytes<br>. . .<br>0xFFFF 64 Kbytes - 1<br>Minimum buffer size is 64 bytes. |

Table 6 below shows an embodiment of a source completion frame descriptor 144 that can be used in system 100 of FIG. 1.

TABLE 6

Source Completion Frame Descriptor Format

| Bits | Name | Description |
|---|---|---|
| 0-1 | DBG | Debug bits are mirrored back in the completion FD for system debug purpose. |
| 2-15 | LIODN | Logical I/O device number. Used for authorization and translation of transaction. |
| 16-19 | BPID | Buffer Pool ID. Specifies the buffer pool identifier used for buffer allocation associated with the compound scatter gather table pointed by address. |
| 20-23 | — | Reserved |
| 24-63 | ADDRESS | 40 bit address. |
| 64-66 | FORMAT | Format bits. Example: 001 - compound frame. All other values are reserved or unused. |
| 76-95 | CONG WEIGHT | Used by Queue Manager to perform congestion management and avoidance for this frame. |
| 96-99 | SRTYPE | DMA source read transaction Type. Example: 0100 non-snp read, 0101 snp read, 1XXX enhanced type. |
| 100 | PREF | Read prefetchable bit. Example: 0 - non-prefetchable, 1 - prefetchable. |
| 101 | — | Reserved |
| 102-104 | SQoS | Source transaction QoS. |
| 105 | SSEN | Source stride enable. |
| 106 | BRR | Buffer release required. |
| 107-108 | CER | Completion status enqueue required. Example: 00 - No completion results are enqueued. 01 - completion results are enqueued to inform the source. 10 - completion results are enqueued to FQID specified in DD to inform targets. 11 - both source and targets are informed |

TABLE 6-continued

Source Completion Frame Descriptor Format

| Bits | Name | Description |
|---|---|---|
| 109-112 | RTHROT | Read Throttle control. Example: 0 - disabled. >0 - DMA unit stops reading from this source when the number of cycle that takes DMA unit to accumulatively issue 256 byte read from this source is smaller than RTHROT*1000. The DMA unit resumes when the number of cycle elapsed since the first read in this batch reaches RTHROT*1000. |
| 113 | MM | Message mode. Indicates whether data can be transferred across a partition boundary. |
| 114-121 | — | Reserved |
| 122 | RTE | Read transaction error. Example: can include transaction error during descriptor read and data read. |
| 123 | WTE | Write transaction error. Transaction error during data write. |
| 124 | BAE | Buffer acquire error. Buffer acquire request is denied due to depleted buffer resources |
| 125 | SDE | Source Descriptor Error. Example: can include zero length, zero stride size with SSEN == 1, illegal source transaction priority (3), and illegal SRTYPE. |
| 126 | DDE | Destination Descriptor Error. Example: can include zero length, Illegal destination transaction priority(3), zero stride size with DSEN == 1, illegal DWTYPE, and illegal length where Destination length > Source length. Note that Destination length can be smaller to allow different length per destination. |
| 127 | ME | Multiple error. |

Table 7 below shows an embodiment of a destination completion frame descriptor 142 that can be used in system 100 of FIG. 1.

TABLE 7

Destination Completion Frame Descriptor Format

| Bits | Name | Description |
|---|---|---|
| 0-1 | DBG | Debug bits are mirrored back in the completion FD for system debug purpose. |
| 2-15 | LIODN | Logical I/O device number. Destination LIODN from mapping VBPID to LIODN. |
| 16-19 | BPID | Buffer Pool ID. Specifies the buffer pool identifier used for buffer allocation associated with the destination scatter/gather table or destination data. |
| 20-23 | — | Reserved |
| 24-63 | ADDRESS | 40 bit address. Destination address (either scatter/gather or data buffer). |
| 64-66 | FORMAT | Format bits. 001 - compound frame. All other values are reserved or unused. |
| 76-95 | CONG WEIGHT | Used by Queue Manager to perform congestion management and avoidance for this frame. |
| 96-99 | SRTYPE | DMA source read transaction Type. Example: 0100 non-snapshot (snp) read, 0101 snp read, 1XXX enhanced type. |
| 100 | PREF | Read prefetchable bit. Example: 0 - non-prefetchable, 1 - prefetchable. |
| 101 | — | Reserved |
| 102-104 | SQoS | Source transaction QoS. |
| 105 | SSEN | Source stride enable. |
| 106 | BRR | Buffer release required. |
| 107-108 | CER | Completion status enqueue required. Example: 00 - No completion results are enqueued. 01 - completion results are enqueued to inform the source. 10 - completion results are enqueued to FQID specified in DD to inform targets. 11 - both source and targets are informed |
| 109-112 | RTHROT | Read Throttle control. Example: 0 - disabled. >0 - DMA unit stops reading from this source when the number of cycle that takes DMA unit to accumulatively issue 256 byte read from this source is smaller than RTHROT*1000. The DMA unit resumes when the number of cycle elapsed since the first read in this batch reaches RTHROT*1000. |
| 113 | MM | Message mode. Indicates whether data can be transferred across a partition boundary. |

TABLE 7-continued

Destination Completion Frame Descriptor Format

| Bits | Name | Description |
|---|---|---|
| 114-121 | — | Reserved |
| 122 | RTE | Read transaction error. Including transaction error during descriptor read and data read. |
| 123 | WTE | Write transaction error. Transaction error during data write. |
| 124 | BAE | Buffer acquire error. Buffer acquire request is denied due to depleted buffer resources |
| 125 | SDE | Source Descriptor Error. Example: can include zero length, zero stride size with SSEN == 1, illegal source transaction priority (3), and illegal SRTYPE. |
| 126 | DDE | Destination Descriptor Error. Example: can include zero length, Illegal destination transaction priority(3), zero stride size with DSEN == 1, illegal DWTYPE, and illegal length where Destination length > Source length. Note that Destination length can be smaller to allow different length per destination. |
| 127 | ME | Multiple error. |

Therefore, by now it can be appreciated that in some embodiments in a data processing system 100 having a direct memory access DMA unit 114 coupled to a memory, a method is provided that comprises generating, by a first software process of the data processing system, a source frame descriptor 202, 204, 206, 208, 210, 212 for a DMA job which requires access to a first partition 134 of the memory which is assigned to a second software process of the data processing system and not assigned to the first software process. The source frame descriptor can comprise a partition identifier VBPID which identifies the first partition of the memory. The method can further include receiving, by the DMA unit, the source frame descriptor for the DMA job; and generating, by the DMA unit, a destination frame descriptor 220, 222, 224, 226 for the DMA job. Generating the destination frame descriptor can comprise translating, by the DMA unit, the partition identifier to a buffer pool identifier BPID which identifies a physical address within the first partition of the memory which is assigned to the second software process; and storing the buffer pool identifier in the destination frame descriptor.

In another aspect, the DMA job requires transfer of message data from a second partition 132 of memory which is assigned to the first software process and not assigned to the second software process to the second partition of memory. The method can further comprise transferring, by the DMA unit, the message data from the second partition to the first partition at the physical address indentified by the buffer pool identifier.

In another aspect, the source frame descriptor comprises a message mode indicator MM which indicates that the message data is to be transferred across a partition boundary.

In another aspect, after generating the source frame descriptor, queuing the source frame descriptor in a source frame descriptor queue in 130 accessible by the DMA unit. Receiving the source frame descriptor can comprise dequeuing, by the DMA unit, the source frame descriptor from the source frame descriptor queue.

In another aspect, the first software process executes on a first processor 104 of the data processing system, and the second software process executes on a second processor 106 of the data processing system. The first partition can be assigned to the second processor and not the first processor, and the second partition is assigned to the first processor and not the second processor.

In another aspect, each of the first software process and the second software process execute on a same processor of the data processing system.

In another aspect, the generating the destination frame descriptor can comprise using the partition identifier to obtain a set of access permissions LIODN for the first partition.

In another aspect, the method can further comprise queuing the destination frame descriptor to a destination completion queue DCQ in 130 accessible by the second software process; and dequeuing, by the second software process, the destination frame descriptor and processing the DMA job.

In another aspect, the translating, by the DMA unit, the partition identifier to the buffer pool identifier comprises accessing secure mapping circuitry 214, 216.

In another aspect, the secure mapping circuitry is configurable only by a hypervisor of the data processing system.

In another aspect, the source frame descriptor comprises a completion enqueue indicator CER. The method can further comprise queuing the destination frame descriptor to a destination completion queue DCQ in 130 accessible by the second software process when the completion enqueue indicator has a first value; queuing the destination frame descriptor to a source completion queue SCQ in 130 accessible by the first software process when the completion enqueue indicator has a second value; and queuing the destination frame descriptor in each of the destination completion queue and the source completion queue when the completion enqueue indicator has a third value.

In another aspect, generating the source frame descriptor comprises storing a completion enqueue disable indicator CED. When the completion enqueue disable indictor has a first value, the destination frame descriptor is not queued to the destination completion queue or the source completion queue, regardless of the value of the completion enqueue indicator of the source frame descriptor.

In another embodiment, a data processing system 100 is configured to execute a first software process and a second software process. The data processing system comprises a DMA unit 114 can be configured to receive a source frame descriptor for a DMA job, wherein the DMA unit comprises secure mapping circuitry 214, 216. The source frame descriptor can be generated by the first software process and the DMA job requires transfer of message data from a first partition 132 of a memory which is assigned to the first software process and not assigned to the second software process to a second partition 134 of the memory which is assigned to the second software process and not the first software process. The source frame descriptor can comprise a partition identifier VBPID which identifies the second partition of the memory as a destination partition for the DMA job. When the DMA unit receives the source frame descriptor, the DMA unit generates a destination frame descriptor in which the DMA unit uses the secure mapping circuitry to translate the partition identifier to a buffer pool identifier BPID which identifies a physical address within the second partition of the memory and stores the buffer pool identifier in the destination frame descriptor, and transfers the message data from the first partition to the second partition at the physical address identified by the buffer pool identifier.

In another embodiment, the source frame descriptor can comprise a message mode indicator MM which indicates that the message data is to be transferred across a partition boundary.

In another aspect, the data processing system can further comprise a first processor 104, coupled to the memory, which executes the first software process; and a second processor 106, coupled to the memory, which executes the second software process.

In another aspect, the DMA unit uses the partition identifier to obtain a set of access permissions LIODN for the first partition for storage into the destination frame descriptor.

In another aspect, the data processing system further comprises a queue manager 130 which comprises a destination completion queue and a source completion queue. The source frame descriptor comprises a completion enqueue indicator CER, wherein when the completion enqueue indicator has a first value, the queue manager queues the destination frame descriptor to the destination completion queue. When the completion enqueue indicator has a second value, the queue manager queues the destination frame descriptor to the source completion queue. When the completion enqueue indicator has a third value, the queue manager queues the destination frame descriptor to each of the destination completion queue and the source completion queue.

In another aspect, the source frame descriptor can comprise a completion enqueue disable indicator CED, wherein, when the completion enqueue disable indictor has a first value, the queue manager does not queue the destination frame descriptor to the destination completion queue or the source completion queue, regardless of the value of the completion enqueue indicator of the source frame descriptor.

In another embodiment, in a data processing system 100 including a first processor, a second processor, and a direct memory access DMA unit 114, each coupled to a memory, a method can comprise generating, by the first processor, a source frame descriptor 202, 204, 206, 208, 210, 212 for a DMA job which requires transfer of message data from a first partition 134 of the memory which is assigned to the first processor and not assigned to the second processor to a second partition of the memory which is assigned to the second processor and not assigned to the first processor. The source frame descriptor comprises a partition identifier VBPID which identifies the first partition of the memory. The source frame descriptor for the DMA job is received by the DMA unit. The DMA unit can generate a destination frame descriptor 220, 222, 224, 226 for the DMA job. The generating the destination frame descriptor can comprise translating, by the DMA unit, the partition identifier to a buffer pool identifier BPID which identifies a physical address within the second partition of the memory which is assigned to the second processor and a set of access permissions LIODN for the second partition. The method can further comprise storing the buffer pool identifier and the set of access permissions in the destination frame descriptor; and transferring the message data from the first partition to the second partition at the physical address identified by the buffer pool identifier.

In another aspect, the source frame descriptor comprises a completion enqueue indicator CER and a completion enqueue disable indicator CED. The method can further comprise, based on values of the completion enqueue indicator and the completion enqueue disable indicator, storing the destination frame descriptor into a source completion queue, into a destination completion queue, into both the destination frame descriptor queue and the source frame descriptor queue, or into neither the destination frame descriptor queue nor the source frame descriptor queue.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. For example, memory unit 112 may be located on a same integrated circuit as processors 102-108 or on a separate integrated circuit or located within another peripheral or slave discretely separate from other elements of system 100.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer processing system such as a personal computer system. Other embodiments may include different types of computer systems.

Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, the virtual and actual buffer pool identifiers and other related information/descriptors may be provided in a different manner or stored elsewhere within system 100. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having a direct memory access (DMA) unit coupled to a memory, the method comprising:
   generating, by a first software process of the data processing system, a source partition descriptor for a DMA job which requires access to a first partition of the memory which is assigned to a second software process of the data processing system and not assigned to the first software process, wherein the source partition descriptor comprises a partition identifier which identifies the first partition of the memory;
   receiving, by the DMA unit, the source partition descriptor for the DMA job; and
   generating, by the DMA unit, a destination partition descriptor for the DMA job,
      wherein the generating the destination partition descriptor comprises:
         translating, by the DMA unit, the partition identifier to a buffer pool identifier which identifies a physical address within the first partition of the memory which is assigned to the second software process; and
         storing the buffer pool identifier in the destination partition descriptor,
      wherein the DMA job requires transfer of message data from a second partition of memory which is assigned to the first software process and not assigned to the second software process to the second partition of memory, the method further comprising:
      transferring, by the DMA unit, the message data from the second partition to the first partition at the physical address identified by the buffer pool identifier.

2. The method of claim 1, wherein the source partition descriptor comprises a message mode indicator which indicates that the message data is to be transferred across a partition boundary.

3. The method of claim 1, further comprising:
   after generating the source partition descriptor, queuing the source partition descriptor in a source partition descriptor queue accessible by the DMA unit, wherein the receiving the source partition descriptor comprises:
      dequeuing, by the DMA unit, the source partition descriptor from the source partition descriptor queue.

4. The method of claim 1, wherein the first software process executes on a first processor of the data processing system, and the second software process executes on a second processor of the data processing system, wherein the first partition is assigned to the second processor and not the first processor, and the second partition is assigned to the first processor and not the second processor.

5. The method of claim 1, wherein each of the first software process and the second software process execute on a same processor of the data processing system.

6. The method of claim 1, wherein the generating the destination partition descriptor comprises:
   using the partition identifier to obtain a set of access permissions for the first partition.

7. The method of claim 1, further comprising:
   queuing the destination partition descriptor to a destination completion queue accessible by the second software process; and
   dequeuing, by the second software process, the destination partition descriptor and processing the DMA job.

8. The method of claim 1, wherein the translating, by the DMA unit, the partition identifier to the buffer pool identifier comprises accessing secure mapping circuitry.

9. The method of claim 8, wherein the secure mapping circuitry is configurable only by a hypervisor of the data processing system.

10. The method of claim 1, wherein the source partition descriptor comprises a completion enqueue indicator, wherein the method further comprises:
    queuing the destination partition descriptor to a destination completion queue accessible by the second software process when the completion enqueue indicator has a first value;
    queuing the destination partition descriptor to a source completion queue accessible by the first software process when the completion enqueue indicator has a second value; and
    queuing the destination partition descriptor in each of the destination completion queue and the source completion queue when the completion enqueue indicator has a third value.

11. The method of claim 10, wherein the generating the source partition descriptor comprises storing a completion enqueue disable indicator, wherein, when the completion enqueue disable indictor has a first value, the destination partition descriptor is not queued to the destination completion queue or the source completion queue, regardless of the value of the completion enqueue indicator of the source partition descriptor.

12. A data processing system configured to execute a first software process and a second software process, the data processing system comprising:
- a DMA unit coupled to a memory;
- a DMA unit configured to receive a source partition descriptor for a DMA job, wherein the DMA unit comprises secure mapping circuitry, and wherein:
  - the source partition descriptor is generated by the first software process and the DMA job requires transfer of message data from a first partition of a memory which is assigned to the first software process and not assigned to the second software process to a second partition of the memory which is assigned to the second software process and not the first software process, the source partition descriptor comprising a partition identifier which identifies the second partition of the memory as a destination partition for the DMA job; and
  - when the DMA unit receives the source partition descriptor, the DMA unit generates a destination partition descriptor in which the DMA unit uses the secure mapping circuitry to translate the partition identifier to a buffer pool identifier which identifies a physical address within the second partition of the memory and stores the buffer pool identifier in the destination partition descriptor, and transfers the message data from the first partition to the second partition at the physical address identified by the buffer pool identifier.

13. The data processing system of claim 12, wherein the source partition descriptor comprises a message mode indicator which indicates that the message data is to be transferred across a partition boundary.

14. The data processing system of claim 12, wherein the data processing further comprises:
- a first processor, coupled to the memory, which executes the first software process; and
- a second processor, coupled to the memory, which executes the second software process.

15. The data processing system of claim 12, wherein the DMA unit uses the partition identifier to obtain a set of access permissions for the first partition for storage into the destination partition descriptor.

16. The data processing system of claim 12, further comprising a queue manager which comprises a destination completion queue and a source completion queue, wherein:
- the source partition descriptor comprises a completion enqueue indicator, wherein:
  - when the completion enqueue indicator has a first value, the queue manager queues the destination partition descriptor to the destination completion queue;
  - when the completion enqueue indicator has a second value, the queue manager queues the destination partition descriptor to the source completion queue; and
  - when the completion enqueue indicator has a third value, the queue manager queues the destination partition descriptor to each of the destination completion queue and the source completion queue.

17. The data processing system of claim 16, wherein the source partition descriptor comprises a completion enqueue disable indicator, wherein, when the completion enqueue disable indictor has a first value, the queue manager does not queue the destination partition descriptor to the destination completion queue or the source completion queue, regardless of the value of the completion enqueue indicator of the source partition descriptor.

18. In a data processing system a first processor, a second processor, and a direct memory access (DMA) unit, each coupled to a memory, the method comprising:
- generating, by the first processor, a source partition descriptor for a DMA job which requires transfer of message data from a first partition of the memory which is assigned to the first processor and not assigned to the second processor to a second partition of the memory which is assigned to the second processor and not assigned to the first processor, wherein the source partition descriptor comprises a partition identifier which identifies the first partition of the memory;
- receiving, by the DMA unit, the source partition descriptor for the DMA job; and
- generating, by the DMA unit, a destination partition descriptor for the DMA job, wherein the generating the destination partition descriptor comprises:
  - translating, by the DMA unit, the partition identifier to a buffer pool identifier which identifies a physical address within the second partition of the memory which is assigned to the second processor and a set of access permissions for the second partition; and
  - storing the buffer pool identifier and the set of access permissions in the destination partition descriptor; and
- transferring the message data from the first partition to the second partition at the physical address identified by the buffer pool identifier.

19. The method of claim 18, wherein the source partition descriptor comprises a completion enqueue indicator and a completion enqueue disable indicator, the method further comprising:
- based on values of the completion enqueue indicator and the completion enqueue disable indicator, storing the destination partition descriptor into a source completion queue, into a destination completion queue, into both the destination partition descriptor queue and the source partition descriptor queue, or into neither the destination partition descriptor queue nor the source partition descriptor queue.

* * * * *